United States Patent [19]

Takagishi et al.

[11] Patent Number: 4,975,859
[45] Date of Patent: Dec. 4, 1990

[54] METHOD OF CONTROLLING PHOTO PRINTER AND APPARATUS THEREFOR

[75] Inventors: Katsufumi Takagishi, Hitachi; Syoichi Ito, Ibaraki, both of Japan

[73] Assignee: Hitachi, Ltd., Tokyo, Japan

[21] Appl. No.: 145,312

[22] Filed: Jan. 19, 1988

[30] Foreign Application Priority Data

Jan. 24, 1987 [JP] Japan .................................. 62-14469

[51] Int. Cl.⁵ ............................................ G01D 15/06
[52] U.S. Cl. .................................. 364/519; 346/33 R
[58] Field of Search .............................. 364/518–521; 346/33 R; 340/747, 750, 798–800

[56] References Cited

U.S. PATENT DOCUMENTS 4,682,279  7/1987  Watabe ................................. 364/141
4,694,405  9/1987  Bradbury et al. .................... 364/518
4,769,648  9/1988  Kishino et al. ..................... 346/33 R

OTHER PUBLICATIONS

"Nikkei Electronics" Apr. 8, 1985 pp. 143–146.

Primary Examiner—Gary V. Harkcom
Assistant Examiner—H. R. Herndon
Attorney, Agent, or Firm—Antonelli, Terry, Stout & Kraus

[57] ABSTRACT

A photo printer such as a laser printer incorporates a bit map memory having a large memory capacity. When the printer is connected to a host computer, a dot pattern corresponding to a bit pattern formed in accordance with the contents of the bit map memory is printed on a sheet in a normal mode. If a special command is transmitted from the host computer to the printer, a data file used by the host computer is temporarily stored in the bit map memory. If another special command is transmitted from the host computer, the data file stored in the bit map memory is transmitted to the host computer. That is, the bit map memory in the printer is used as the memory for temporarily storing the files of the host computer.

6 Claims, 5 Drawing Sheets

METHOD OF CONTROLLING PHOTO PRINTER AND APPARATUS THEREFOR

BACKGROUND OF THE INVENTION

The present invention relates to a method and apparatus for controlling a photo printer such as a laser printer, and particularly relates to an improvement of a method and apparatus for controlling a photo printer in which a bit map memory having a large capacity which has been conventionally used only for printing can be used in other uses.

Examples of photo printers include a laser printer, a liquid crystal printer using a liquid crystal shutter array, and the like. Although being applicable to any kind of photo printers, the present invention will be described in connection with a laser printer by way of example. Prior to the description of the present invention, a prior art laser printer control apparatus will be described in reference to the drawings. FIG. 1 is a block diagram showing the whole arrangement of the conventional laser printer control apparatus.

In FIG. 1, the laser printer control apparatus is provided with: an MPU 1 for controlling the laser print operation; a host computer 2 (hereinafter simply referred to as "host") for transmitting printing data to a laser printer; a reception FIFO 3 having a buffer function for storing the data transmitted only from the host 2; a line memory 4 for storing the data stored in the reception FIFO 3 by line (text data provided with a control code for indicating for example carriage return attached at the line end); a bit map memory 5 having a large capacity of bits corresponding one to one to a print dot pattern to be printed on a paper 13 expressed by the data in the line memory 4; a laser printer printing portion 6, that is, a printing mechanism for printing the dot data in the bit map memory 5; a laser printer interface 7 for converting the parallel data read out from the bit map memory 5 into serial data so as to transmit the serial data to the laser printer printing portion 6; an ROM 8 for storing a program to be executed by the MPU 1; a character generator ROM (CGROM) 9 used for developing the data stored in the line memory 4 into the bit map memory 5; a cable 11 for transmitting the data of the host 2 to the reception FIFO 3; and an internal bus 12 for transmitting data, control signals, etc. between the MPU 1 and the constituent elements. A laser printer control circuit 10 is formed of the constituent elements 1, 3 through 5, 7 through 9, and 12. A laser printer 100 is formed of the laser printer circuit 10 and the laser printer printing portion 6.

FIG. 2 is a flow-chart showing the printing operation performed by the control apparatus 10 shown in FIG. 1. Referring to FIGS. 1 and 2, the operation of the conventional laser printer control apparatus will be described hereunder.

In FIG. 1, the data transmitted from the host 2 is stored in the reception FIFO 3. In a step 20 of FIG. 2, whether there is data in the reception FIFO 3 or not is judged. If there is data, the operation is shifted to a step 21 of FIG. 2. When the data, does not include any developing command such as a carriage return command (CR), a line feed command (LF), or the like, the operation is shifted to a step 22 in which the data is transferred to the line memory 4 in FIG. 1. When a developing command such as a line feed command, a carriage return command, or the like, is present in the data transmitted from the host 2, data in the line memory 4 is converted into a printing dot pattern data corresponding to the data and developed into a bit pattern in the bit map memory 5 corresponding to the dot pattern (a step 23). The dots in the dot pattern correspond one by one to the bits in the bit pattern. Further, when there is a print command, such as a page feed command (FF), or the like, in the data transmitted from the host 2, the operation is shifted to a step 24 in which the dot data in the bit map memory 5 is transferred to the laser printer 6 so that the dot pattern is printed by the laser printer 6 (in a step 25).

The prior art concerned with the laser printer control apparatus is disclosed, for example, in "NIKKEI ELECTRONICS", published Apr. 8, 1985, (pages 143 through 146).

The arrangement and operation of the conventional laser printer control apparatus have been described above in reference to FIGS. 1 and 2. However, the data transmission in the conventional apparatus of the kind described above is carried out by a one-way transmission system in which the data-transmitted from the host 2 is merely transferred to the printer 100 and the bit map memory 5 is left in an unused state except during the printing time.

However, the bit map memory 5 used in the laser printer control apparatus 10 has a large capacity of about 1 M bytes in order to improve the resolution of the printed dot pattern. Accordingly, if the bit map memory 5 having such a large capacity used only during printing can be used employed for other uses, the apparatus of the kind described above can be effectively put to practical use. For example, the host connected to the printer uses a memory having a large capacity to carry out processing such as numerical calculation, external-character formation, and the like, and therefore the capacity of the memory in the host becomes insufficient frequently.

SUMMARY OF THE INVENTION

It is therefore an object of the present invention to solve the problems in the prior art described above.

It is another object of the present invention to provide a method and apparatus for controlling photo printer in which the bit map memory having a large capacity which has been used only for the printing operation can be used not only as a memory for carrying out the original purpose of data printing, but also as a memory for storing data files of the host. In a preferred embodiment of the present invention, there is provided an improved method and apparatus for controlling a photo printer, in which the data transmitted from the host is temporarily stored in the bit map memory in accordance with a data write command transmitted from the host, while the data file designated by the host is read out of the bit map memory so as to be transmitted to the host in accordance with a data-file read command transmitted by the host, thereby making it possible to improve the effective practical use of a resource in the system of the kind described above more remarkably than the conventional apparatus.

In order to attain the above objects, in a photo printer having a bit map memory for storing data transmitted from a host after converting the data into dot data so as to print the dot data stored in the bit map memory, the photo printer controlling method and apparatus therefor are arranged such that, according to the present invention, there is provided a bidirectionally transmissible transmission/receiving buffer arranged to operate as a reception buffer in a reception mode in which data transmitted from the host is received and to operate as a transmission buffer in a transmission mode in which data is transmitted to the host, whereby the dot data stored in the bit map memory is printed in a normal data print mode, while other data transmitted from the host is temporarily stored in the form of a data file in the bit map memory in accordance with a data write command in a data save mode, and the data file designated by the host is read out of the bit map memory and transmitted to the host in accordance with a data read command in the data save mode.

DESCRIPTION OF THE PREFERRED EMBODIMENT

Figure 3:
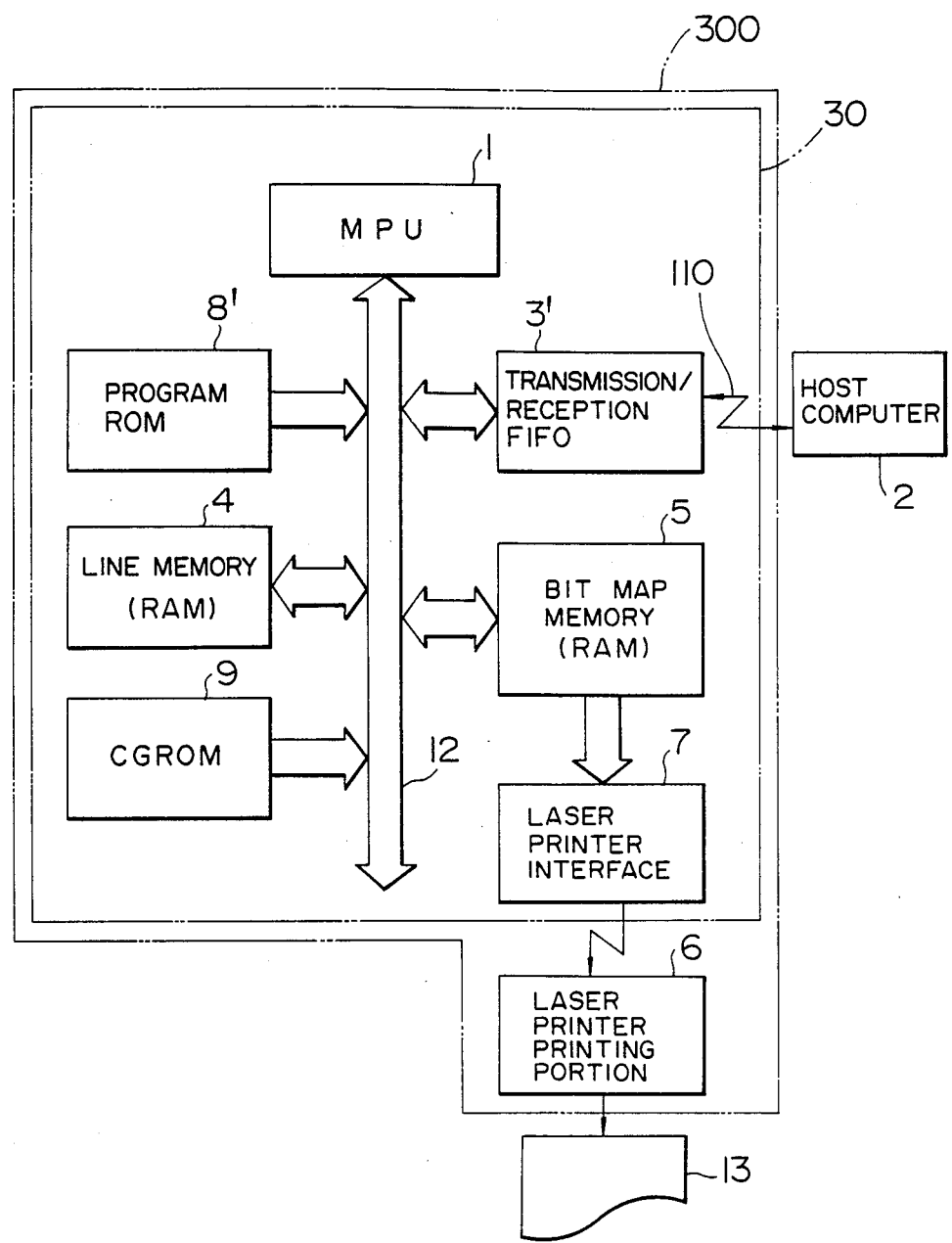
FIG. 3 is a block diagram showing the whole arrangement of an embodiment of the laser printer control apparatus according to the present invention.
Figure 4:
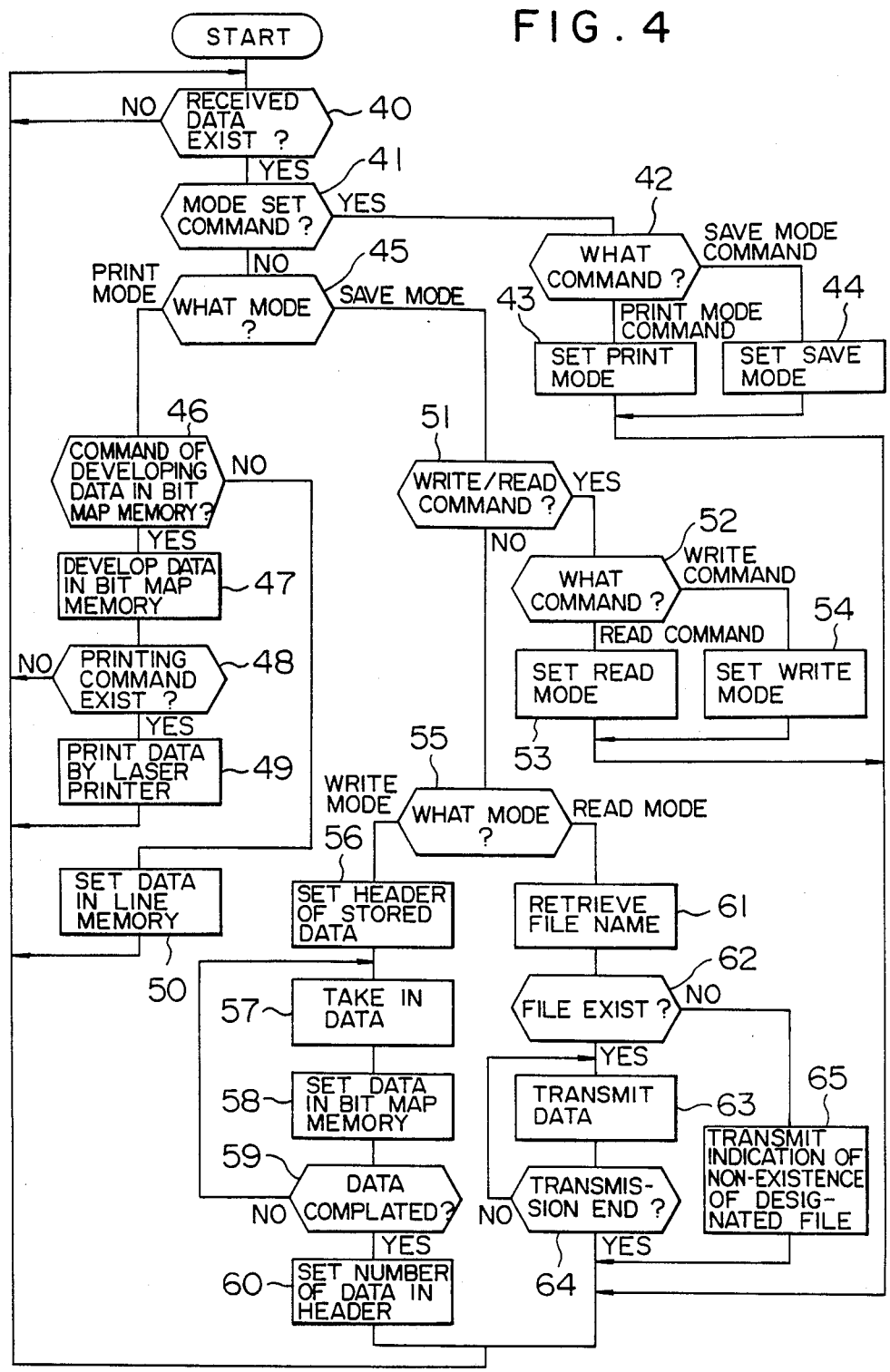
FIG. 4 is a flow-chart showing the printing operation executed by the control apparatus shown in FIG. 3.
Figure 5:
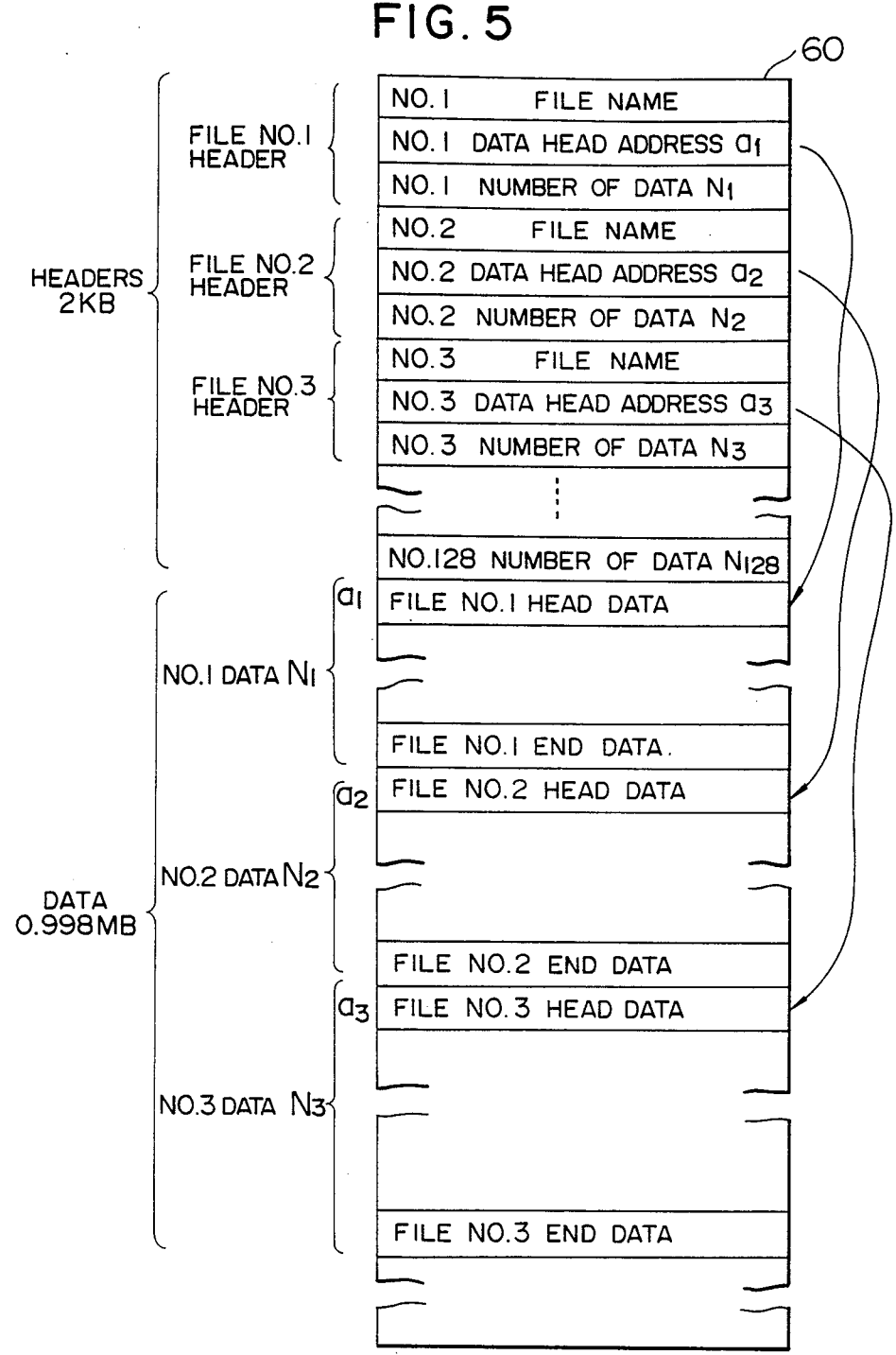
FIG. 5 is a schematic view showing the state in which data files transmitted from a host 2 are being stored in a bit map memory 5 of FIG. 3.

Referring to FIGS. 3 through 5, an embodiment of the present invention will be described hereunder. FIG. 3 is a block diagram showing the whole arrangement of the laser printer control apparatus which is an embodiment of the present invention.

Figure 1:
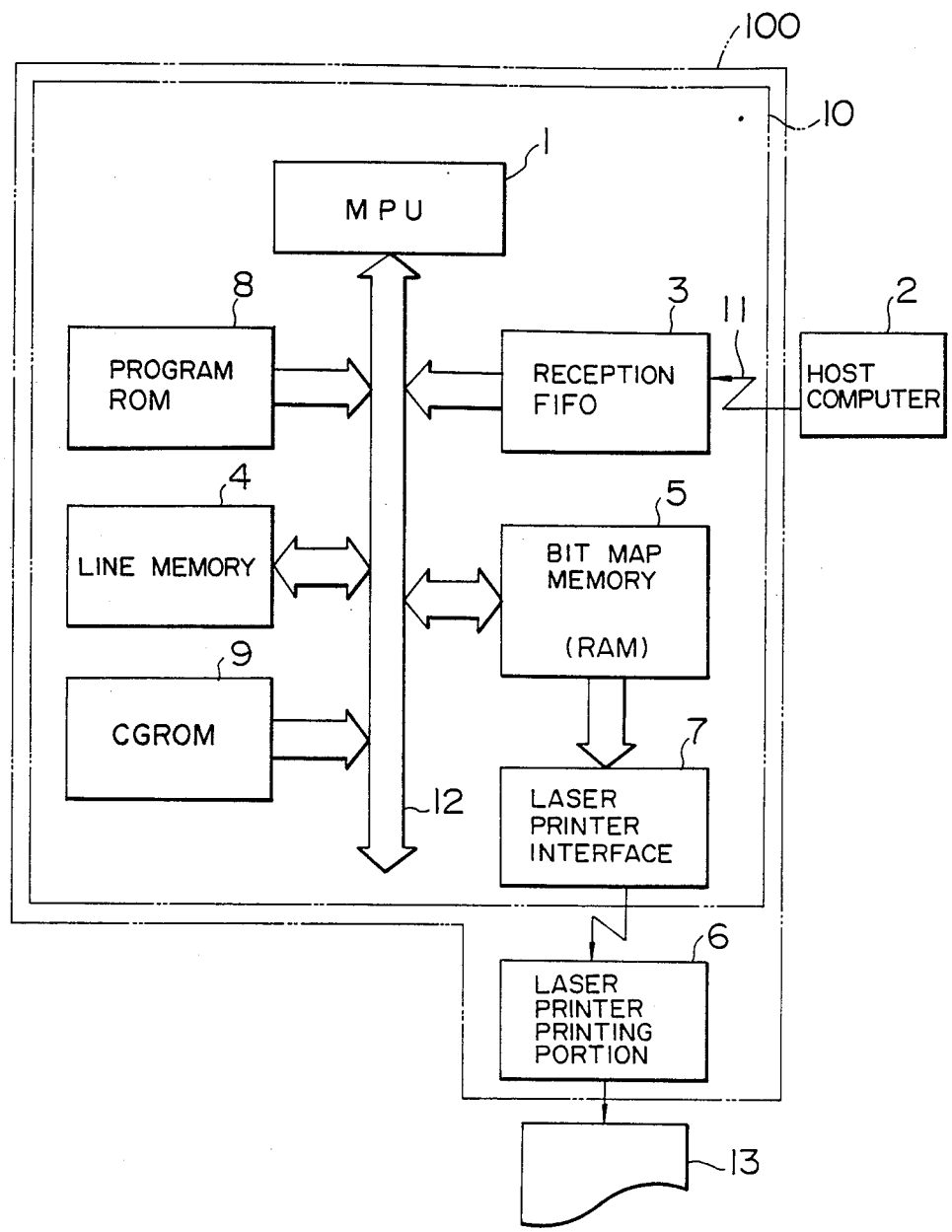
FIG. 1 is a block diagram showing the whole arrangement of a conventional laser printer control apparatus.
Figure 2:
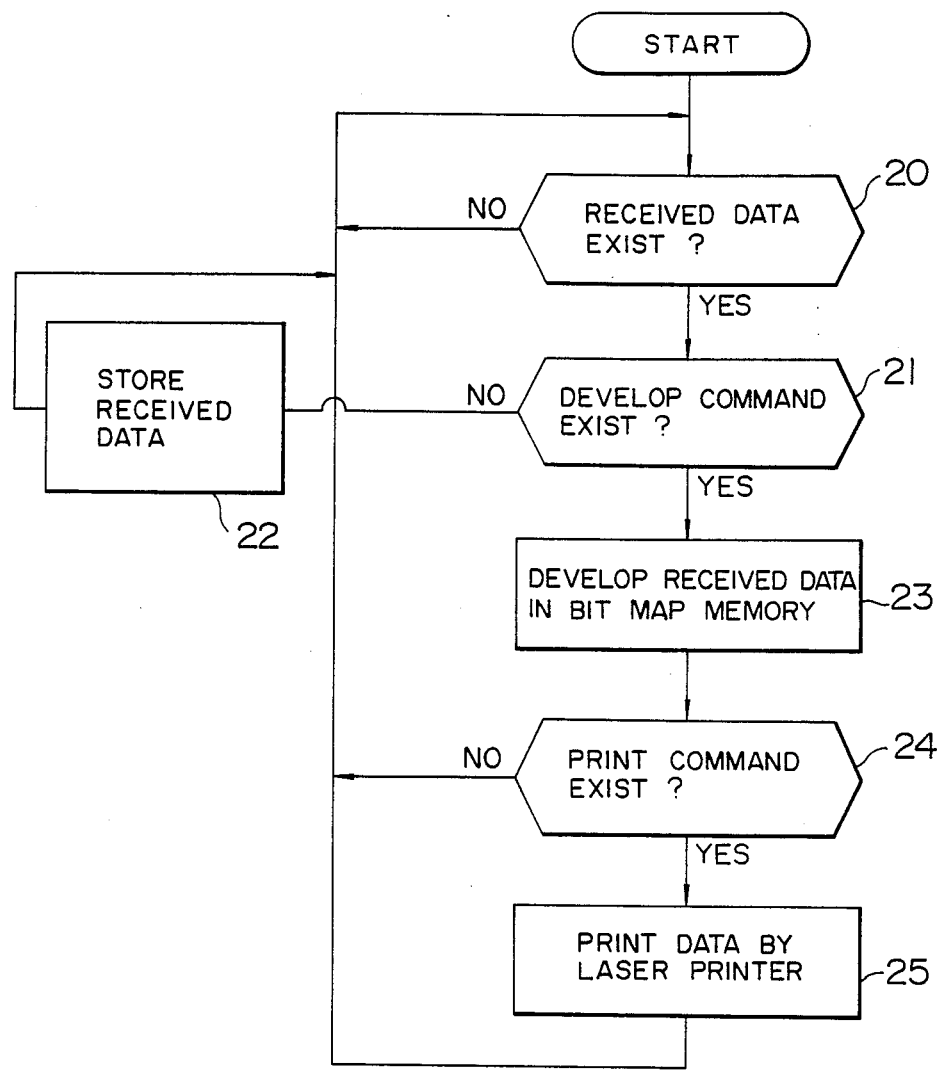
FIG. 2 is a flow-chart showing the printing operation executed by the control apparatus shown in FIG. 1.

In FIG. 3, the laser printer control apparatus arrangement is provided with an MPU 1 for controlling the operation of a laser printer control apparatus 30, a host 2 for transmitting/receiving data, a transmission/ reception FIFO 3' which is changed over between a transmission FIFO and a reception FIFO by the MPU 1 in accordance with the designation by the host 2, a line memory 4 for storing the data of the transmission/ reception FIFO 3' by line in a print mode, and a bit map memory 5 having a large capacity of 1 M bytes. The bit map memory 5 stores dot pattern data corresponding to the data in the line memory 4 as a bit pattern in a print mode. As will be described later, the bit map memory 5 temporarily stores the data transmitted from the host 2 in the form of a file in the bit map memory 5 in accordance with a data file write command generated from the host 2 and reads out a data file designated by the host 2 from the bit map memory 5 so as to transmit the read-out data file to the host 2. The laser printer control apparatus arrangement is further provided with an ROM 8' which stores a program executed by the MPU 1 and which is different in contents from the ROM 8 in FIG. 1, and a bidirectional parallel-data transmission cable 110. Although data may be transmitted serially, it is preferable to transmit data parallelly. With respect to other parts than those described above, the same reference numerals in FIG. 3 as those in FIG. 1 designate the same or equivalent parts. In FIG. 3, the laser printer control apparatus 30 constitutes a laser printer 300 together with a laser printer printing portion 6.

FIG. 4 is a flow-chart in the case where a data printing or data storing operation is performed by the control apparatus shown in FIG. 3. In the operations, there are two modes, that is, a data print mode and a data save mode. The data save mode has a data write mode and a data read mode. The change-over between the data print mode and the data save mode is performed by the MPU 1 in the steps 42, 43 and 44 when a data print mode designating command or a data save mode designating command is transmitted from the host 2, and the change-over between the data write mode and the data read mode in the data save mode is performed by the MPU 1 in the steps 52, 53 and 54 when a data write mode designating command or a data read mode designating command is transmitted from the host 2.

Referring to FIGS. 3 and 4, the operation of the laser printer control apparatus as illustrated in the embodiment of the present invention will be described hereunder.

When a command to select the data print mode is generated from the host 2 in FIG. 3, the command is checked in the steps 41 and 42 in FIG. 4, and the mode is set to the received-data print mode by the MPU 1 in the step 43 so that the transmission/reception FIFO 3' in FIG. 3 is set to the reception FIFO by the MPU 1 and the printing operation is carried out similarly to the conventional case (steps 46, 47. 48,, 49 and 50). Therefore, the detailed description of such operations is omitted here.

When a command to select the data save mode is transmitted from the host 2, on the other hand, the command is checked in the steps 41 and 42 in FIG. 4 and the mode is set to the received-data save mode by the MPU 1 in the step 43. Next, when a data file write command is transmitted from the host 2, the command is checked in the steps 51 and 52, and the mode is set to the data file write mode by the MPU 1 in the step 54. Thereafter, when there exist received data, the operation is passed through the steps 41, 45, 51 and 55, a header of the data file to be stored is formed in the step 56, the data is taken in from the transmission/reception FIFO 3' in the step 57, the data is stored in the bit map memory 5 in the step 58, a judgement is made as to whether the reception of data has been completed or not in the step 59, and if the judgement proves that the reception of data has been completed, the amount of data is set in the header in the step 60, and the operation is terminated. The format for storing data in the bit map memory 5 is such that, as shown in FIG. 5, data headers are stored in the bit map memory 5 successively from the head address (128 headers in this embodiment). Each header is formed of a file name (8 bytes), a data head address (4 bytes), and the amount of data in one file (4 bytes). Accordingly, the whole capacity for all the headers is 2 K bytes. The bit map memory 5 is provided with a data portion next to the header portion, and the whole capacity of the data portion is 0.998 M bytes. Since the amount of data in a file for each of the headers can be changed, the data portion is arranged to be flexible so as to be able to cope with a case in which the number of stored files is small while the quantity of data in each file is large.

On the other hand, if a data file read command is transmitted from the host 2 in the data-file save mode, the command is checked in the steps 51 and 52, and the mode is set to the data read mode by the MPU 1 in the step 53. Thereafter, when there exists received data, the operation is passed through the steps 41, 45, 51 and 55, the file name designated in the received data by the host 2 is retrieved by the MPU 1 from the header portion of the bit map memory 5 in the step 61, and a signal indicating that the designated file does not exist is transmitted to the host 2 in the step 65 when the designated file name is not located in the header portion of the bit map memory 5. If the designated file name is located in a header of the header portion in the bit map memory 5 in the step 62, the head address of the data file is retrieved from the header and all the data of the designated data file is transmitted to the host 2 in the steps 63 and 64. After completion of transmission of the designated file from the host 2, the transmission/ reception FIFO 3' is set to the transmission FIFO mode by the MPU 1, and set to the reception FIFO mode after transmission of data to the host 2.

It is necessary to set the mode to either the print mode or the save mode upon turning-on an electric source of the control apparatus 30. In the embodiment, the mode is set to the print mode upon turning-on the electric source, while it is set to the data read mode immediately after the mode has been set to the save mode in accordance with a save mode designating command.

That is, while such a bit map memory having a large capacity has been conventionally used merely for a printing operation in a printer connected to a host, the present invention makes it possible to use such a bit map memory having a large capacity not only for the original purpose of printing, but as a data storing memory of the host.

In the above description, the data transmitted from the host 2 to the laser printer in the print mode may include text data, bit image data, graphics data, etc. The data may be developed in the bit map memory 5 by the MPU 1 in such a manner as follows. With respect to the text data, dot data corresponding to the text is read out from a character font in the CGROM 9 and developed in the bit map memory 5. The bit image data is developed directly in the bit map memory 5 not indirectly through the line memory 4. With respect to the graphics data, dot data obtained by the MPU 1 through calculation of addresses to be developed is developed in the bit map memory 5. Specific measure to develop the data in the bit map memory 5 is not directly concerned with the present invention and therefore the description such operation is omitted here. In the embodiment of the present invention, the memory capacity of the bit map memory 5 is selected to be 1 MB. However, it is a matter of course that if the memory capacity is larger than 1 MB, the effect becomes high, however the memory capacity may be made smaller than 1 MB so long as the capacity is sufficient to store the data files formed by the host 2.

According to the present invention, an arrangement is made as described above. As apparent from the description of the illustrated embodiment, according to the present invention, the bit map memory having a large capacity which has been conventionally used only for the printing operation can be used not only as the memory for carrying out the original purpose of data printing, but as the memory for storing data files of the host. The data transmitted from the host is temporarily stored in the bit map memory in accordance with a data write command transmitted from the host, while the data file designated by the host is read out of the bit map memory so as to be transmitted to the host in accordance with a data-file read command transmitted from the host. Thus, it is possible to obtain an improved photo printer control apparatus and method in which the effective practical use of a resource in the system of the kind described above can be more remarkably improved than the conventional apparatus.

What is claimed is:

1. A method of controlling a printer having connection means for connecting the printer to a host computer and having a bit map memory, comprising the steps of:
   transmitting data from said host computer to said printer through said connection means;
   developing data transmitted from said host computer into dot pattern data, storing said dot pattern data in said bit map memory, and printing said dot pattern data in a normal mode of operation;
   storing data transmitted from said host computer in the form of a file to be used for data processing in said bit map memory in response to a first command transmitted from said host computer; and
   reading out a file designated by said host computer from said bit map memory in response to a second command transmitted from said host computer and transmitting said designated file to said host computer through said connection means.

2. A printer controlling method according to claim 1, wherein said connection means includes a transmission/reception buffer capable of transmitting data bidirectionally between said bit map memory and said host computer.

3. A printer controlling method according to claim 1, wherein said storing step includes storing a plurality of files in said bit map memory including headers each indicating a file name, a file head address, and the amount of the data in the corresponding one of said files being stored in said bit map memory.

4. A printer controlling method according to claim 1, wherein said printer is a laser printer.

5. A printer control apparatus comprising:
   a transmission/reception buffer capable of transmitting data bidirectionally, said buffer being connected to a host computer and being arranged to operate as a reception buffer in receiving data and to operate as a transmission buffer in transmitting data to said host computer;
   a bit map memory for storing a plurality of data bits in one-to-one relationship corresponding to dots of a dot pattern to be printed; and
   control means, connected to said transmission/reception buffer and said bit map memory, for:
   (a) developing data transmitted from said host computer through said transmission/reception buffer into dot pattern data, storing said dot pattern data in said bit map memory, and printing said dot pattern data in a normal mode of operation;
   (b) storing data transmitted from said host computer through said transmission/reception buffer in the form of a file to be used for data processing in said bit map memory in response to a first command transmitted from said host computer in a save mode of operation; and
   (c) reading out a file designated by said host computer from said bit map memory in response to a second command transmitted from said host computer and transmitting said designated file to said host computer through said transmission/reception buffer in a save mode of operation.

6. A laser printer comprising:
   a transmission/reception buffer capable of transmitting data bidirectionally, said buffer being connected to a host computer and being arranged to operate as a reception buffer in receiving data and to operate as a transmission buffer in transmitting data to said host computer.

a bit map memory for storing a plurality of data bits in one-to-one relationship corresponding to dots of a dot pattern to be printed;

a laser printer for printing the contents of said bit map memory; and control means, connected to said transmission/reception buffer, said bit map memory, and said laser printer, for:

(a) developing data transmitted from said host computer into dot pattern data, storing said dot pattern data in said bit map memory, and causing said laser printer to print said dot pattern data in a normal mode of operation;

(b) storing data transmitted from said host computer via said transmission/reception buffer in the form of a file to be used in data processing in said bit map memory in response to a first command transmitted from said host computer in a save mode of operation; and (c) reading out a file designated by said host computer from said bit map memory in response to a second command transmitted from said host computer and transmitting said designated file to said host computer via said transmission/reception buffer in a save mode of operation.

* * * * *